United States Patent
Simkins

(10) Patent No.: US 7,136,793 B2
(45) Date of Patent: Nov. 14, 2006

(54) SYSTEM AND METHOD FOR MODELING A PROPAGATION AND CONTAINMENT PROCESS

(75) Inventor: David J. Simkins, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 771 days.

(21) Appl. No.: 10/341,244

(22) Filed: Jan. 14, 2003

(65) Prior Publication Data

US 2004/0138863 A1 Jul. 15, 2004

(51) Int. Cl.
G06G 7/48 (2006.01)

(52) U.S. Cl. .............................. 703/6; 703/13; 706/16; 714/38; 714/39

(58) Field of Classification Search .................... 703/6, 703/13; 714/12, 38, 42, 48, 39, 5, 10; 706/16; 370/217
See application file for complete search history.

(56) References Cited

U.S. PATENT DOCUMENTS

| | | | |
|---|---|---|---|
| 5,321,613 A | | 6/1994 | Porter et al. |
| 5,486,995 A | | 1/1996 | Krist et al. |
| 5,502,728 A | * | 3/1996 | Smith, III ..................... 714/5 |
| 5,710,700 A | | 1/1998 | Kurtzberg et al. |
| 5,740,084 A | | 4/1998 | Hardin et al. |
| 5,835,898 A | | 11/1998 | Borg et al. |
| 5,914,875 A | | 6/1999 | Monta et al. |
| 6,167,406 A | | 12/2000 | Hoskins et al. |
| 6,173,246 B1 | | 1/2001 | Billups, III |
| 6,178,522 B1 | * | 1/2001 | Zhou et al. ................... 714/12 |
| 6,622,260 B1 | * | 9/2003 | Marisetty et al. ............. 714/10 |
| 6,961,874 B1 | * | 11/2005 | Lodrige ....................... 714/38 |
| 7,020,076 B1 | * | 3/2006 | Alkalai et al. ............. 370/217 |
| 2003/0217309 A1 | * | 11/2003 | Lodrige ....................... 714/39 |

OTHER PUBLICATIONS

Somani, A. Achieving Fault Tolerance and High Reliability, Microprocessors and Microsystems, vol. 21, No. 3, Dec. 1997, pp. 147-150.*
Schmidt, T.H. Model-Based Fault Diagnosis: Knowledge Acquisition and System Design, Proceedings of the 2nd Int. Conference on Industrial and Engineering Applications of Artificial Intelligence and Expert Systems, vol. 1 IEA/AIE '89, Jun. 1989, pp. 21-25.*

(Continued)

Primary Examiner—Russell Frejd
(74) Attorney, Agent, or Firm—Ronald E. Prass, Jr.; Isaacson, Irving, Stelacone & Prass, LLC

(57) ABSTRACT

The systems and methods for modeling of a propagation and a containment process described herein enable the modeling of containment processes by mathematically mapping a containment process onto a topological model. The systems and methods described herein can model the effects of various degrees of data fusion and automation that are present in specific locations throughout the containment process. In addition, human and automated responses to propagated defects within the containment process can also be modeled.

The method for modeling a containment process includes building a topological model of a containment process having a plurality of containment levels, with each containment level having a containment node. A behavior is then assigned to each containment node. The behavior is configured to model defect propagation based upon a first predetermined level of data fusion in the containment node. The model is executed with the first predetermined level of data fusion and data are output configured to represent the level of defect propagation present in the containment process. Finally a second predetermined level of data fusion, different from the first predetermined level of data fusion, is modeled.

21 Claims, 8 Drawing Sheets

OTHER PUBLICATIONS

Lala et al., J.H. A Design Approach for Ultrareliable Real-Time Systems, IEEE, Computer, vol. 24, No. 5, May 1991, pp. 12-22.*

Stott et al., D.T. Dependability Analysis of a High-Speed Network Using Software-Implemented Fault Injection and Simulated Fault Injection, IEEE Transactions on Computers, vol. 47, No. 1, Jan. 1998, pp. 108-119.*

Chisholm et al., G.H. An Application of Formal Analysis to Software in a Fault-Tolerant Environment, IEEE Transactions on Computers, vol. 48, No. 10, Oct. 1999, pp. 1053-1064.*

Lala et al.,. J.H. Architectural Principles for Safety-Critical Real-Time Applications, Proceedings of the IEEE, vol. 82, No. 1, Jan. 1994, pp. 25-40.*

Kaufman et al. "Modeling of Common-Mode Failures in Digital Embedded Systems." *Proceedings. Annual Reliability and Maintainability Symposium, 2000.* Jan. 2000. pp. 350-357.

Harel, D. and O. Kupferman. "On the Behavioral Inheritance of State-Based Objects." *Proceedings. 34th International Conference on Technology of Object-Oriented Languages and Systems, 2000.* Aug. 2000. pp. 83-94.

Palumbo, D. "Automating Failure Modes and Effects Analysis." *Proceedings. Annual Reliability and Maintainability Symposium, 1994.* Jan. 1994. pp. 304-309.

Brumfield, Jeff. Client/Server Modeling Using Strategizer (tm). Version R0100. 1997.

* cited by examiner

SYSTEM AND METHOD FOR MODELING A PROPAGATION AND CONTAINMENT PROCESS

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The systems and methods described herein enable the modeling of a propagation and a containment process by mathematically mapping a containment process onto a topological model. The systems and methods described herein, can model the effects of various degrees of data fusion and automation that are present in specific locations throughout the containment process. This enables a user to analyze and understand the containment process in terms of how efficiently data fusion is performed throughout the containment process. It also enables a user to analyze and understand the containment process in terms of the amount of automation present throughout the containment process. The model can provide a user with information detailing the level of containment present in the containment process under a host of different environments. In addition, human and automated responses to propagated defects within the containment process can also be modeled.

Containment processes are ubiquitous and can be found in almost every environment. A containment process is any process where, in response to the introduction of a defect, an effort is made to limit the spread or propagation of that defect, this effort being proactive or reactive. Therefore, in order to model a containment process accurately, the propagation process may need to be modeled as well. The systems and methods described herein can model the containment process as well as the underlying propagation process.

The defect introduced can be any presence that is capable of propagation within a process and which the user desires to contain. The defect may be an unwanted stimulus, a readily apparent pass-fail defect, or a complex pattern of factors that may or may not produce unwanted effects depending on the environment or operating conditions.

One example of a containment process is a biological response to an unwanted pathogen such as a virus entering the human body. In this case the defect is a virus, which must be contained to maintain the host's health. This example could be broadened to include a viral outbreak in the population, and the effort made to contain the spread of the virus from one person to another over a geographical area. Another example is the set of complex patterns and factors that, if not properly contained, may result in the growth of a cancerous tumor. Yet another example is the propagation of a manufacturing defect throughout a manufacturing process. All of these examples illustrate how widespread containment processes are, and accordingly, they in no way limit the scope of the systems and methods described herein.

Figure 1:
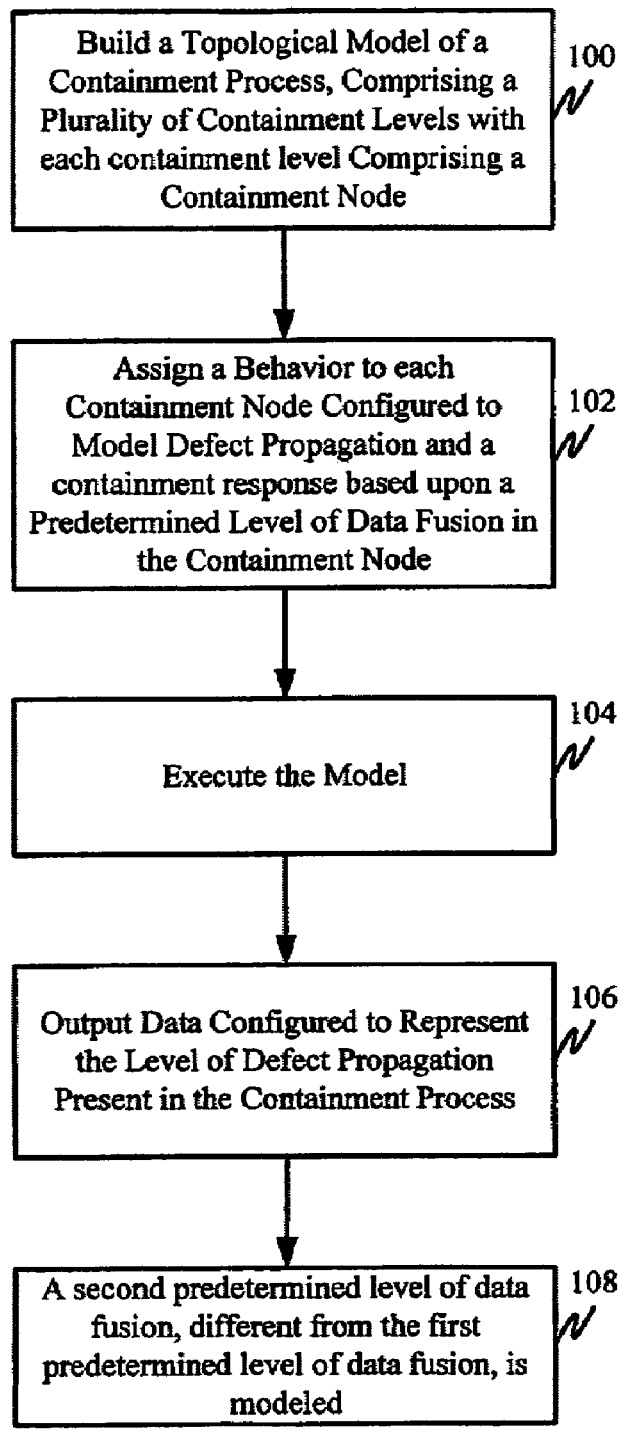
FIG. 1 is a flow chart depicting a method for modeling a containment process according to an embodiment of the present invention.

FIG. 1 depicts one embodiment of a method for modeling a containment process in accordance with the systems and methods described herein. At 100, a user builds a topological model of a containment process having multiple containment levels, each having at least one containment node. At 102, a behavior is assigned to each containment node. The behavior is configured to model defect propagation based upon a predetermined level of data fusion or automation in the containment node. At 104, the model is executed, and at 106, data is output that is configured to represent the level of defect propagation present in the containment process.

This model can be configured to use probabilistic distributions in determining whether or not an event occurs, when they occur, and therefore multiple executions can be performed to output more reliable data. In one embodiment, thousands of executions are performed so that the output data converge to a single value or range of values that is representative of the level of defect propagation in the containment process.

Finally, at 108, a second predetermined level of data fusion, different from the first predetermined level of data fusion, is modeled. This allows the user to compare the level of containment present with different amounts of data fusion in place. A user modeling a containment process can model multiple different data fusion scenarios to determine what amounts of data fusion present at which nodes provides the greatest level of containment. Based on the results, the user can change the amount and location of data fusion in the actual containment process to improve the overall level of containment. The user can also improve the efficiency of the containment process, removing data fusion in areas where the benefit in the overall level of containment is unnecessary. This same analysis can be done for automation as well. The systems and methods described herein can be implemented on widely available modeling software. For example, the modeling software currently available to the public under the trademark HyperformiX Strategizer may be used.

Figure 2:
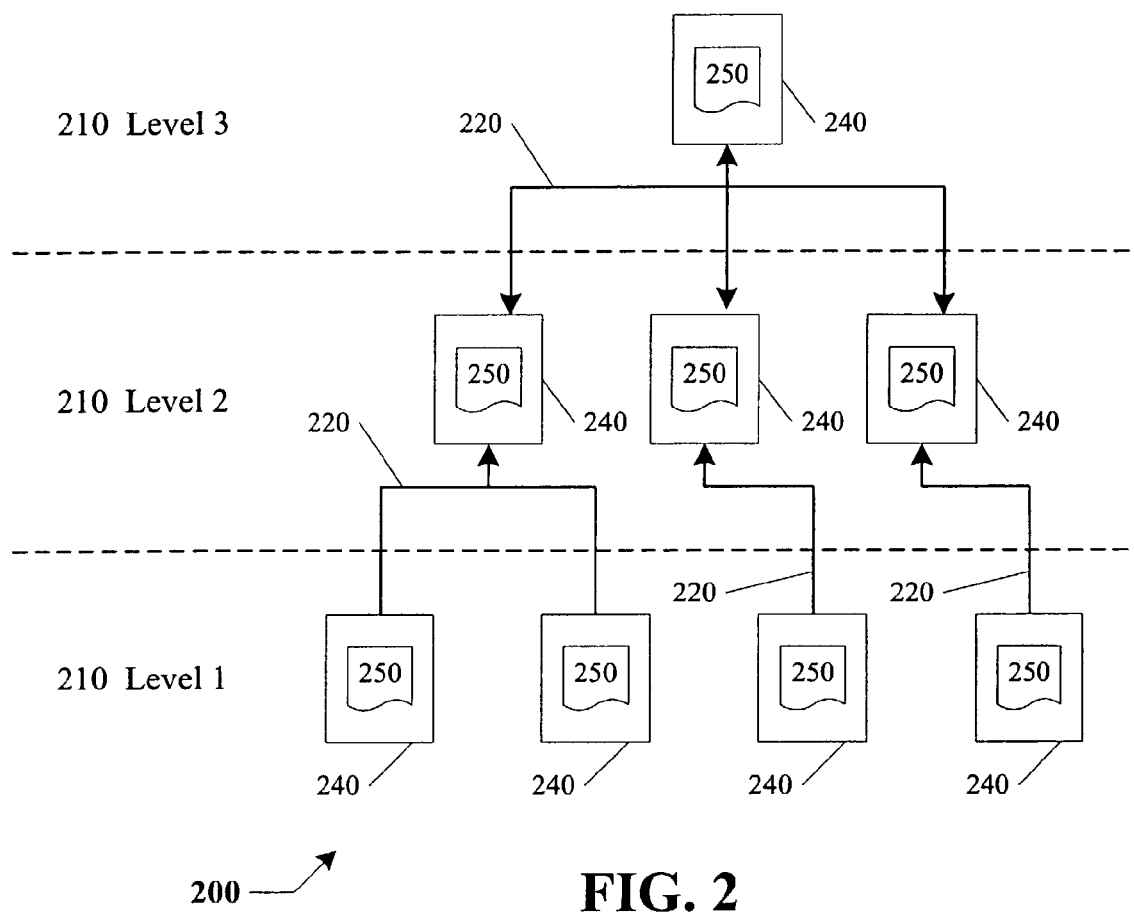
FIG. 2 is a block diagram depicting a topological model according to an embodiment of the present invention.

FIG. 2 depicts an embodiment of a topological model 200 in accordance with one embodiment of the systems and methods described herein. In this embodiment, model 200 is arranged in a hierarchical manner with three containment levels 210, labeled as Levels 1, 2 and 3. Each of the three containment levels 210 has at least one containment node 240. Topological model 200 is a structural model of the containment process where levels 210 represent stages within the containment process. The containment nodes 240 within each level 210 represent various processes or actions occurring within that level 210. The accuracy of model 200 is dependent on the degree to which it accurately represents the actual containment process. Preferably, the user has an understanding of the major components of the containment process and the working of the process flow, which enables him or her to accurately build model 200.

Defects within model 200 can be introduced at any level 210 and at any node 240, depending on the actual containment process being modeled. Similar to actual containment processes, model 200 can be configured to propagate defects in any direction throughout model 200. Multiple defects can be introduced at multiple levels 210 at any time, and defects already introduced within model 200 can propagate through any node 240. Preferably, the user will model the potential routes of propagation based on the actual containment process being modeled. A potential propagation route 220 is modeled by connecting two nodes 240 within model 200.

After model 200 is built, behavior 250 is assigned to each node. Behavior 250 can be configured to model defect propagation in node 240 based upon a predetermined level of data fusion in node 240. Data fusion is the matching of a set of data or patterns to a cause or symptom. One example of data fusion is the matching of a set of symptoms to an illness or disease. Another example is the matching of the characteristic of a silicon transistor to the set of conditions present when the transistor was being fabricated. Data fusion can be performed manually, as in a mother diagnosing her child's illness, or automatically, as in the use of a diagnostic software on an automobile. The predetermined level of data fusion supplied to behavior 250 can be based upon known levels of data fusion present in the actual containment process, or it can be variable, either according to a probabilistic distribution or chosen at random.

Behavior 250 can also be configured to model defect propagation in node 240 based upon a predetermined level of automation within node 240. This configuration can be made in place of data fusion, or behavior 250 can be configured to model defect propagation based upon data fusion as well as automation. Automation is the level of automatic, or self-operating, functionality within node 240. Many containment processes rely on automation to assist human efforts, or to replace them altogether. The presence of various degrees of automation can have a significant effect on defect propagation and the containment process. Like the case with data fusion, the predetermined level of automation supplied to behavior 250 can be based upon known levels of automation present in the actual containment process, or it can be variable, either according to a probabilistic distribution or chosen at random.

Model 200 can be configured to model all of the significant propagation and containment responses that occur at node 240. This is achieved by assigning a behavior 250 to each node 240. Because of the complexity in modeling a containment process, multiple behaviors 250 can be assigned to each node 240. Behavior 250 can be configured to model the probability of the introduction of a defect at node 240, as well as the probability that the defect will be propagated to another node 240. Behavior 250 can model the frequency of the introduction of a defect, and whether the introduction is fixed or variable, in which case the introduction can be dependent on a probabilistic distribution. Behavior 250 can also model the various contingencies surrounding the introduction of a defect, such as whether the defect is in fact real, as opposed to a false alarm.

Behavior 250 can also be configured to model more complex propagation and containment responses, such as the human and automated responses that occur within the containment process. These responses can include basic responses such as alarms, analysis, containment, trace, test and repair. Automated responses can require little or no prior knowledge of the actual containment process because of the potential for an automated response to be predictable and easily modeled. A human response, by its nature, is generally unpredictable and dependent on multiple factors. Therefore, human responses may require a prior knowledge of the actual containment process. For instance, empirical data indicating the nature of a human response collected over time within the actual containment process may be desired. Whether these responses are modeled as human, automated, or both, depends upon the actual containment process.

In one embodiment, each node 240 is configured to interact with one or more other nodes 240. This enables model 200 to more accurately and efficiently model the actual containment process. The interaction between nodes 240 allows behavior 250, which occurs at one node 240, to affect the outcome of another behavior 250, which occurs at a separate node 240. For instance, behavior 250 can analyze whether a defect is real or false more accurately and efficiently if results of the same analysis from another node 240 are interactively provided to the first behavior 250. This is an example of cross-containment. Cross-containment occurs whenever node 240 bases a containment response, in whole or in part, on information or aid provided by a separate node 240.

In one embodiment, each response is modeled in terms of time and accuracy. In other words, the effect of the response on the containment process is dependent upon how quickly the response is made and whether the response is accurate, e.g., whether a defect is fully contained or is only partially contained and allowed to propagate to another node 240. Quick and accurate responses correlate to a higher level of containment. Both time and accuracy are modeled as a stochastic process.

Once model 200 is built and a behavior 250 is assigned to each node 240, model 200 can be executed. Model 200 then outputs data that are configured to represent the level of defect propagation present in the containment process. These data are customizable to the needs of the user and can be placed in a format that is applicable to the actual containment process. For example, if the containment process models an oil spill, the output data can be the number of square miles affected, or the number of wildlife displaced and so forth. Therefore, the systems and methods described herein allow a user to mathematically model a containment process, including both human and automated responses, and output data that are configured to represent the overall level of defect propagation, given the various degrees of data fusion and automation present within the process.

Figure 3:
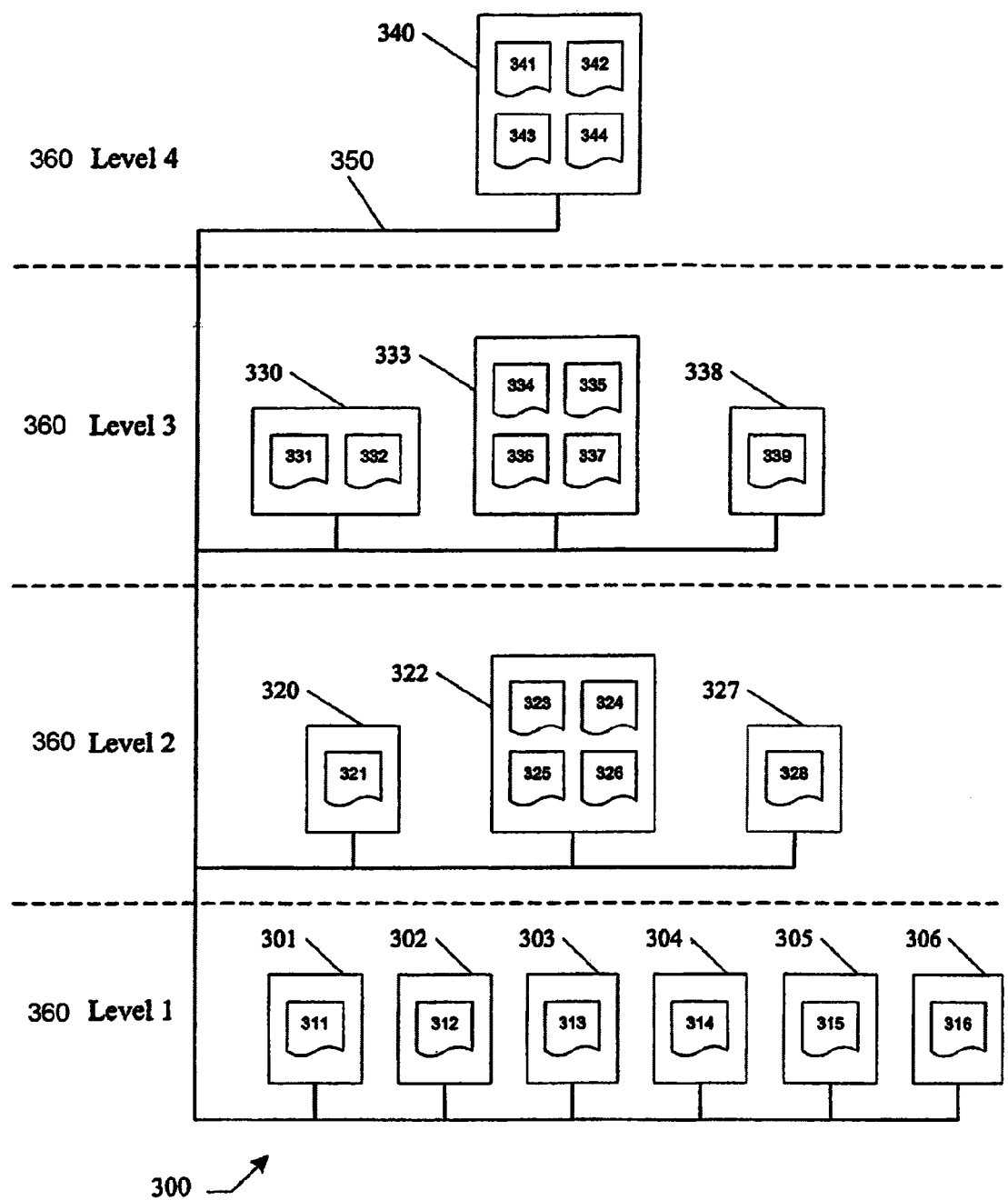
FIG. 3 is a block diagram depicting a topological model according to another embodiment of the present invention.

FIG. 3 depicts one embodiment of topological model 300 in accordance with the systems and methods described herein. Model 300 may be a specific implementation of the generic model 200 depicted in FIG. 2. In this embodiment, a containment process is modeled within an automotive vehicle manufacturing environment. In this embodiment, the goal of the containment process is to minimize the potential for costly automobile recalls by containing all defective automobiles within the manufacturing environment.

In an ideal manufacturing environment, only defective vehicles are contained and all good vehicles are allowed to propagate outside the environment and into the marketplace. If a recall into the manufacturing environment is necessary, then the goal is to recall only defective vehicles and not good vehicles. Therefore, the containment process attempts to contain all defective automobiles from reaching the marketplace.

If defective automobiles do reach the marketplace, then the containment process attempts to recall only the defective vehicles. Accordingly, a containment process with a high level of containment contains a large number of defective vehicles for every good vehicle contained, either in the manufacturing environment or in a recall. A containment process with a low level of containment either fails to contain enough defective vehicles or contains a large amount of good vehicles in the manufacturing environment or in a recall.

FIG. 3 depicts a containment process modeling the containment of propagated defects involved in the assembly of an automotive vehicle, starting with the assembly of an individual power train and the individual power train components themselves. In depicting this embodiment, the various nodes and behaviors are given a separate numbering scheme for purposes of clarification. Each node and behavior shown in FIG. 3 is equivalent to the node and behavior discussed above.

Model 300 has four levels 360, labeled Levels 1, 2, 3 and 4, each connected by potential propagation route 350. Level 1 corresponds to the power train component assembly line. Nodes 301–306 each correspond to the automatic or manual responses that occur in the assembly of the three power train components: the engine, the transmission and the electrical system. Nodes 301–306 model the introduction and detection of defects in each assembly line. Defects that are not detected propagate into Level 2, which corresponds to the assembly of the power train itself.

The automated and manual detection of defects in the engine assembly line is modeled by nodes 301 and 302, respectively. The automated and manual detection of defects in the transmission assembly line is modeled by nodes 303 and 304, respectively, and the automated and manual detection of defects in the electrical system assembly line is modeled by nodes 305 and 306, respectively. Level 1 is a low level within the model 300 hierarchy and, accordingly, the defect introduction and detection process is relatively simple as compared to the higher Levels 2, 3, and 4. As a result, behaviors 311–316 are relatively simple compared to behaviors in the higher levels. Each behavior models the rate of introduction of defects at each node 301–306, either at a fixed rate or according to a probabilistic distribution, where defects have a higher probability of introduction during specific times. The behavior also models the likelihood of a defect's detection at Level 1, in which case the defect is contained and repaired. Defects that go undetected propagate to Level 2.

Defective power train components propagating into Level 2 are assembled at power train (PT) assembly node 320, which has PT alarm behavior 321 assigned to it. PT alarm behavior 321 models how often defects propagated from Level 1 set off alarms at Level 2, as well as how long it takes to set off the alarm. PT alarm behavior 321 also models any cross-containment advantages provided by other nodes in model 300. A cross-containment advantage in this embodiment is information from other nodes pertaining to defects present in node 320. In this embodiment, the cross-containment advantage reduces the amount of time necessary to detect defective power train assemblies. Defects that go undetected at node 321 propagate into Level 3, while defects that are detected proceed to PT containment node 322.

Four containment responses are modeled at PT containment node 322. These responses are modeled with PT false alarm behavior 323, PT analysis behavior 324, PT trace behavior 325 and PT containment behavior 326. PT false alarm behavior 323 models the introduction of false alarms into Level 2. One example causing a false alarm is a malfunction in the alarm creation process such as faulty data. PT analysis behavior 324 models the analysis of a detected defect to determine the cause of the defect and to determine if the defect is real or simply a false alarm. PT trace behavior 325 models the tracing of, the source of the defect and the identification of the affected power train assemblies. Once the affected batches or lots of subassemblies are traced, they must be contained.

PT containment behavior 326 models the containment of the defective power train assemblies in terms of how long it takes to contain and how accurate the containment is. This can depend on multiple factors including whether there is cross-containment and whether a false alarm is present. While a shorter length of time to contain will result in more vehicles contained, it can decrease the accuracy of the containment resulting in more good vehicles being rejected. In this embodiment, PT containment behavior 326 is configured to output data configured to represent the level of defect propagation present in Level 2 of the containment process. The data represent the ratio of good vehicles contained to bad vehicles contained. The time and accuracy data collected up to this point, applied over all of the vehicles that propagated through Level 2 in the relevant time frame, and output in this ratio, allows the user to understand the level of containment achieved in the containment process through Level 2.

Figure 4:
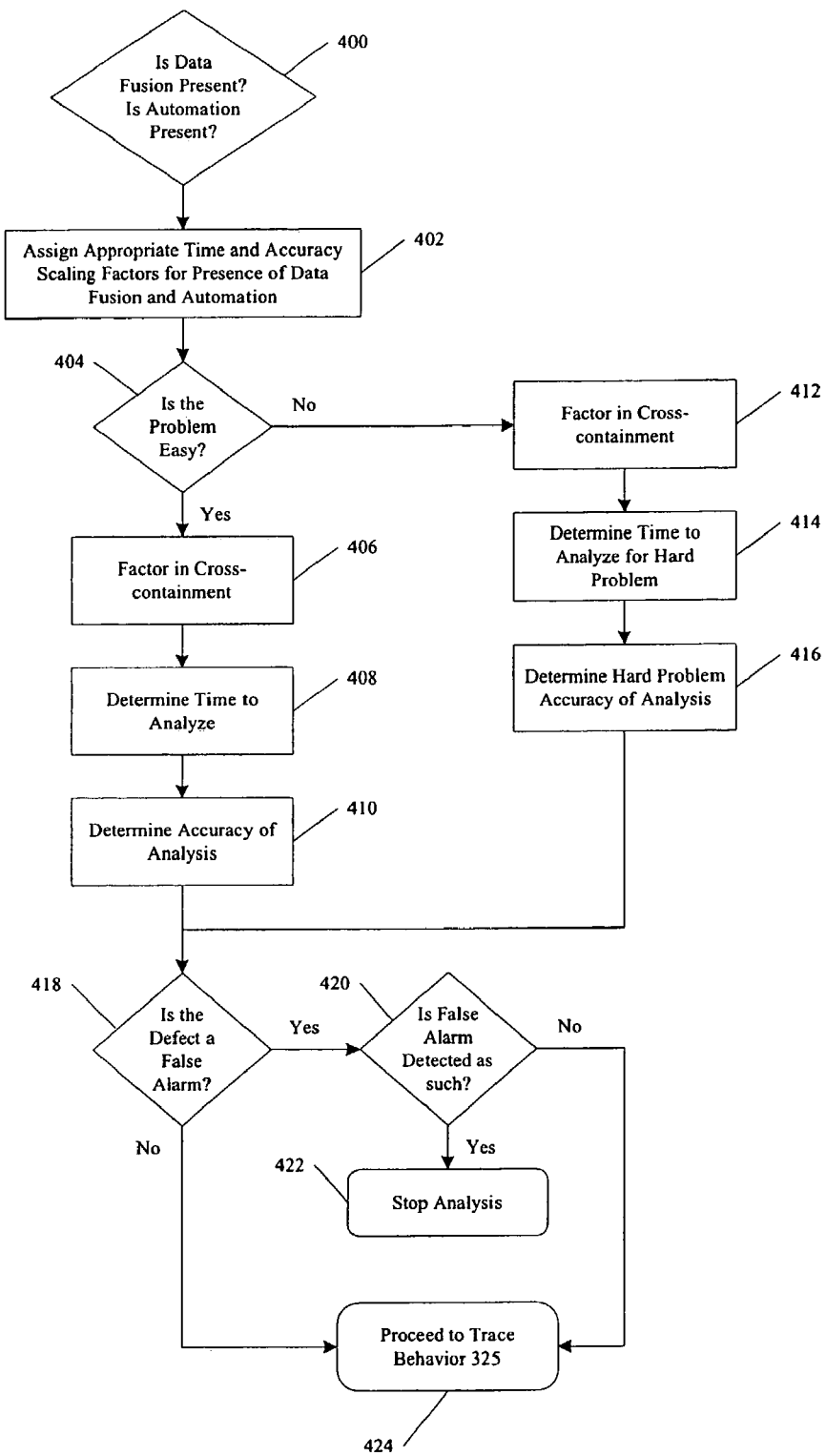
FIG. 4 is a flow chart depicting a method for modeling a containment process according to another embodiment of the present invention.

One embodiment of PT analysis behavior 324 is depicted as a flow chart in FIG. 4. At 400, behavior 324 determines if data fusion and automation are present. Four combinations are possible: neither data fusion nor automation is present, data fusion but not automation is present, automation but not data fusion is present, and both data fusion and automation are present. The presence of data fusion or automation can decrease the time involved in completing the analysis as well as increase the accuracy of the analysis. In this embodiment, there is a predetermined level of data fusion and automation, which is equivalent to a percentage probability. At 400, behavior 324 determines whether data fusion and automation are present based on these predetermined probabilities.

A containment cost can be associated with different amounts of fusion by determining and assigning a first cost to containment of defects at different levels and a second cost to false rejection. In calculating the first cost, it may be assumed that the earlier containment of a defect reduces the first cost. For example, a defect occurring at Level 1 in FIG. 2 or 3 may cost less to contain if it is contained before it propagates to Level 2. The containment cost is equal to the first cost plus the second cost. The containment cost can be compared to the implementation cost of providing fusion. It may be assumed that a low level of fusion costs less to implement than a higher level of fusion. For example, if the containment cost of a low level of fusion is A, and the implementation cost of providing the low level of fusion is B, it might be considered a good business decision to increase to a higher level of fusion having a lower containment cost C and a higher implementation cost D, so long as (D−B)<(A−C).

The degree by which time and accuracy is improved is dependent upon the actual containment process. Therefore, some prior knowledge of the benefits of data fusion and automation may be required. The benefits can be constant over the entire containment process or can vary between nodes 240 (or 301–306, 320, 322, 327, 330, 333, 338 or 340). In this embodiment, the time and accuracy measurements are scaled depending on the presence of data fusion or automation. The amount by which the time and accuracy measurements are scaled is dependent on the predetermined benefits of the presence of data fusion and automation.

At 402, behavior 324 assigns the proper time and accuracy scaling factors based upon the presence of data fusion and automation determined at 400. At 404, behavior 324 determines if the analysis of the defect is an easy problem or a hard problem. In this embodiment, this determination is based on a predetermined understanding of the frequency of easy and hard problems that occur at node 322. The distinction between what constitutes an easy problem versus what constitutes a hard problem is dependent upon the actual containment process. This distinction can be based on any factor the user desires. Some examples include, but are not limited to: the frequency of problems occurring which take under an hour to resolve; the frequency of problems based on easily recognizable defects; and the frequency of problems which require the efforts of multiple humans working at node 322.

If the problem is easy then the presence of cross-containment is factored in at 406. At 408, the time to complete the analysis, using the appropriate data fusion and automation scaling factors, is determined. At 410, the accuracy of the analysis, using the appropriate data fusion and automation scaling factors, is determined. If the problem is hard, the presence of cross-containment is factored in at 412. To reflect the presence of a hard problem, the appropriate data fusion and automation scaling factors are scaled again, resulting in the likelihood that more time is required for analysis and less accuracy is present in the analysis as compared to the easy problem. At 414, the time to complete the analysis for a hard problem is determined and at 416, the accuracy of the analysis of the hard problem is determined.

At 418, behavior 324 determines if the defect is a false alarm. If the defect is real, then, at 424, model 300 proceeds to PT trace behavior 325. If the defect is not real but is in fact a false alarm, then at 420, behavior 324 determines if the false alarm is recognized as such. If the false alarm is recognized then the analysis response is stopped at 422. If the false alarm is not recognized, then model 300 proceeds to PT trace behavior 325 at 424.

Therefore, in this embodiment, PT analysis behavior 324 is configured to determine the time and accuracy to complete a defect analysis in the power train assembly Level 2 based upon the presence of data fusion and automation at node 322. Behavior 324 also determines the difficulty of the problem and whether there is a cross-containment advantage provided by another node 240 (or 301–306, 320, 322, 327, 330, 333, 338 or 340). These determinations are reflected in the time and accuracy of completing the response.

Figure 5:
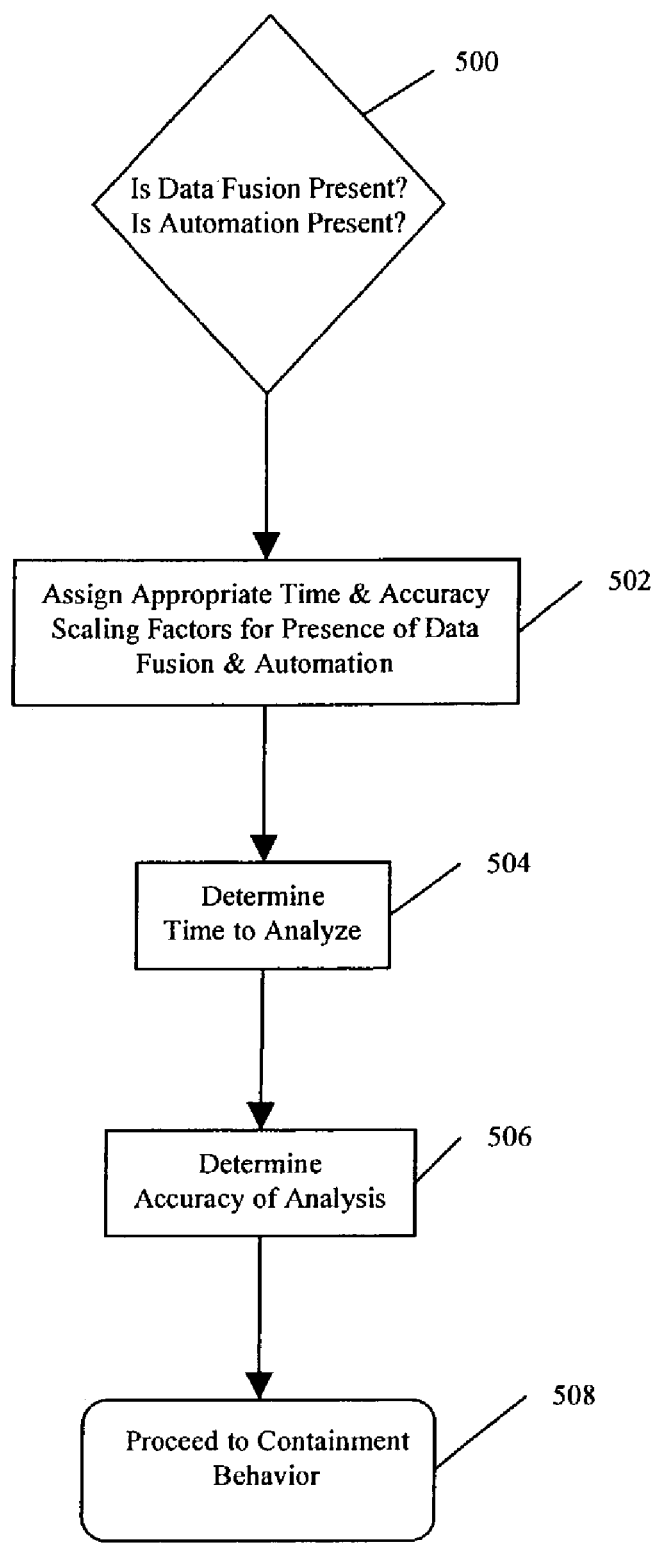
FIG. 5 is a flow chart depicting a method for modeling a containment process according to another embodiment of the present invention.

One embodiment of PT trace behavior 325 is depicted as a flow chart in FIG. 5. At 500, behavior 325 determines if data fusion and automation are present. The absence of data fusion or automation can increase the time involved in tracing the defective vehicles as well as decrease the accuracy of trace activity modeled by PT trace behavior 325. The degree by which time and accuracy suffer is dependent upon the actual containment process. In this embodiment, the time and accuracy measurements are scaled depending on the presence of data fusion or automation, and the amount by which the time and accuracy measurements are scaled is dependent on the predetermined benefits of the presence of data fusion and automation. The presence of data fusion in behavior 325 results in a near perfect ability to trace defective vehicles, and as a result the accuracy does not suffer.

At 502, behavior 325 assigns the proper time and accuracy scaling factors based upon the presence of data fusion and automation determined at 500. At 504, behavior 325 determines the time to complete the analysis, using the appropriate data fusion and automation scaling factors. At 506, the accuracy of the analysis, again using the appropriate data fusion and automation scaling factors, is determined.

Once the time and accuracy is determined, model 300 proceeds to PT containment behavior 326 at 508.

Figure 6:
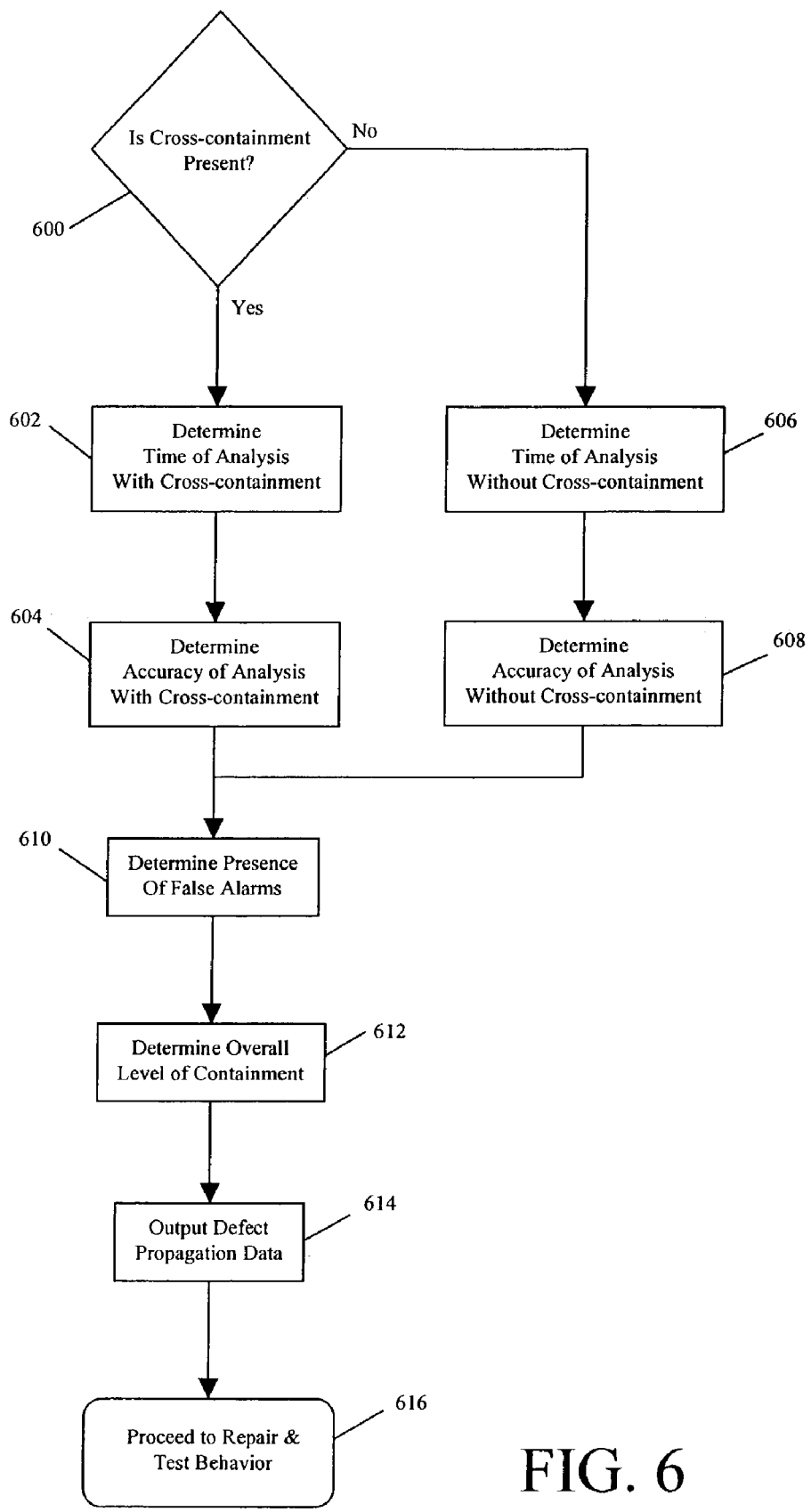
FIG. 6 is a flow chart depicting a method for modeling a containment process according to another embodiment of the present invention.

One embodiment of PT containment behavior 326 is depicted as a flow chart in FIG. 6. At 600, behavior 326 determines if cross-containment is present. The presence of cross-containment can decrease the time involved in completing the analysis as well as increase the accuracy of the analysis. The degree by which time and accuracy are improved is dependent upon the actual containment process. Therefore, some prior knowledge of the benefits of cross-containment may be required. The benefits can be constant over the entire containment process or can vary between nodes 240 (or 301–306, 320, 322, 327, 330, 333, 338 or 340). In this embodiment, the time and accuracy measurements are scaled depending on the presence of cross-containment, and the amount by which the time and accuracy measurements are scaled is dependent on the predetermined benefits of the presence of data fusion and automation.

If cross-containment is present, then at 602, behavior 326 determines the time to complete the analysis given the presence of cross-containment. At 604, the accuracy of the analysis is determined given the presence of cross-containment. If cross-containment is not present, then at 606, behavior 326 determines the time to complete the analysis given the absence of cross-containment. At 608, the accuracy of the analysis is determined given the absence of cross-containment. In this embodiment, the accuracy of the containment is dependent upon the time to contain in two respects. First, a longer time to contain will generally result in a more accurate containment. Second, a longer time to contain will allow more defective subassemblies to propagate through the manufacturing environment. Accordingly, a shorter containment time may not necessarily result in a higher level of containment.

At 610, the presence of any false alarms is determined. At 612, behavior 326 determines the overall level of containment thus far in the process. The presence of a false alarm would mean that the containment efforts to this point have been unnecessary. At 614, data is output that is configured to represent the level of defect propagation present in the containment process at this point within node 322. In this embodiment, the output data shows bad vehicles both contained and missed, as well as good vehicles contained. At 616, model 300 proceeds to PT repair and test behavior 328, within PT repair and test node 327.

Figure 7:
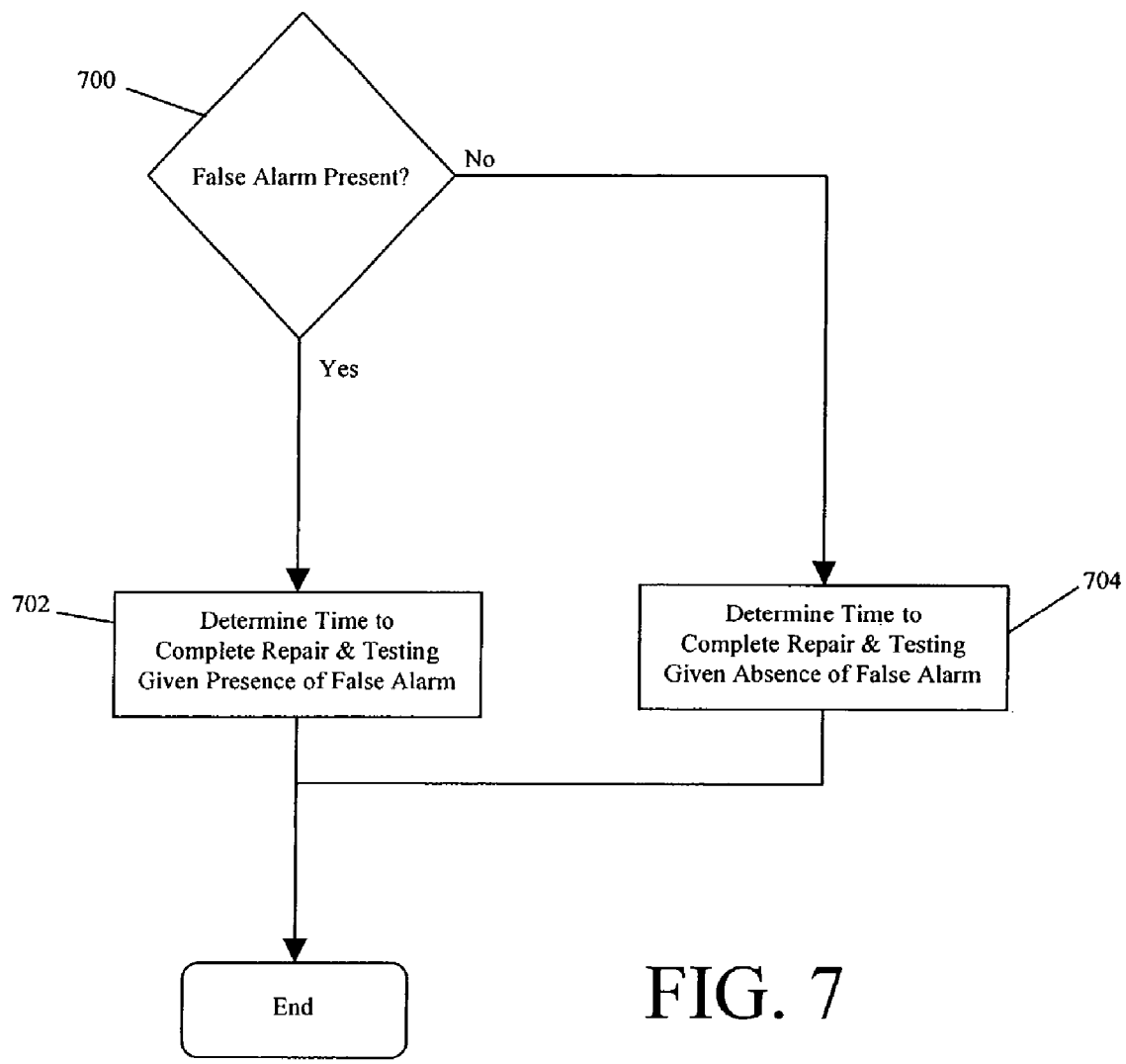
FIG. 7 is a flow chart depicting a method for modeling a containment process according to another embodiment of the present invention.

PT repair and test node 327 models the repair and test responses in Level 2. Here, contained vehicles are repaired and tested before being allowed to propagate to Level 3. The PT repair and test response at node 327 is modeled by PT repair and test behavior 328. One embodiment of PT repair and test behavior 328 is depicted as a flow chart in FIG. 7. In this embodiment, PT repair and test behavior 328 models the repair and test response in terms of time but not accuracy because testing ensures that vehicles are repaired accurately in this embodiment. However, other embodiments are contemplated where testing does not ensure accurate repairs.

At 700, behavior 328 determines if a false alarm is present. The presence of a false alarm results in substantially similar repair times for good and bad vehicles, mainly because bad vehicles are in fact good. If a false alarm is present, then at 702, behavior 328 determines the time to complete the repair and testing given the presence of the false alarm. If a false alarm is not present, then at 704, behavior 328 determines the time to complete the repair and testing given the absence of the false alarm. At this point assembly of the power train is complete.

After assembly of the power train is complete, the entire vehicle is assembled at a Vehicle Assembly (VA) mode—Level 3. However, not all defective power train assemblies were caught by PT alarm behavior 321 and some propagated into Level 3. Vehicle build node 330 models the construction of the entire vehicle and has two behaviors assigned to it, Level 3 alarm behavior 331 and VA build alarm behavior 332. Because new subassemblies are built at Level 3 in this embodiment, VA alarm behavior 331 models the detection of defects created at Level 3 according to a probabilistic distribution.

VA build alarm behavior 332 models how often defects propagated from Level 2 set off alarms at Level 3, as well as how long it takes to set off the alarm, similar to how PT alarm behavior 321 models the detection of detects propagated from Level 1. There are 4 classes of defects present at node 333: those that were undetected at Level 2, those associated with defective power trains that were detected at Level 2 but escaped to Level 3 anyway, those defects detected and isolated at Level 4 which are handled by cross-containment and those defects detected by Level 3 alarm behavior 331. In this embodiment, a certain percentage of the defects propagated from Level 2 may be detected at Level 3. This percentage is derived from an analysis of the actual containment process. Those defects that are undetected defects propagate to Level 4, while the detected defects follow a containment path similar to that of Level 2, proceeding through VA containment node 333 and VA repair and test node 338.

VA containment node 333 models four containment responses with VA false alarm behavior 334, VA analysis behavior 335, VA trace behavior 336 and VA containment behavior 337. VA false alarm behavior 334 models the introduction of false alarms into Level 3. VA analysis behavior 335 models the analysis of a detected defect to determine the cause of the defect and to determine if the defect is real or simply a false alarm. VA trace behavior 336 models the tracing of the source of the defect and the identification of the affected vehicle assemblies.

VA containment behavior 337 models the containment of the defective vehicle assemblies in terms of how long it takes to contain and how accurate the containment is. In this embodiment, VA containment behavior 337 is configured to output data configured to represent the level of defect propagation present in Level 3 of the containment process. The data represent the ratio of good vehicles rejected to bad vehicles rejected. The time and accuracy data collected up to this point, applied over all of the vehicles that propagated through Level 3 in the relevant time frame, and output in this ratio, allow the user to understand the level of containment achieved in the containment process through Level 3.

After VA containment behavior 337, the contained vehicle assemblies are sent to VA repair and test node 338. VA repair and test node 338 models the repair and test responses in Level 3. Here, contained vehicles are repaired and tested before being allowed to propagate to Level 4 and out of the manufacturing environment into the marketplace. The VA repair and test response at node 337 is modeled by VA repair and test behavior 338.

Overseeing Levels 1–3 is the manufacturing Headquarters (HDQ) node 340 in Level 4. Node 340 has four behaviors assigned to it, Level 4 alarm behavior 341, HDQ Analysis behavior 342, HDQ containment behavior 343 and HDQ false alarm behavior 344. Level 4 is not a manufacturing level like Levels 1–3, but is instead a management level that performs mainly data mining responses. Data Fusion and automation still exist at Level 4, but at a much higher cognitive level. Data mining is a significant focus at Level 4. The higher cognitive level and data mining aspects require a different paradigm than the systems and methods used at the lower levels. In this embodiment the data fusion and automation activities are lumped together and input as a single accuracy value.

Level 4 detects defects and contributes to the cross-containment and containment responses. Level 4 alarm behavior 341 models the detection of defects propagating from Level 3. HDQ analysis behavior 342 models the analysis of defects detected at Level 4 to determine if they are real or false. Cross-containment provided by Level 4, in the form of alerts or alarms generated by the corporate headquarters and pushed down to the lower levels, is accounted for in the cross-containment variables implemented in Levels 2 and 3. HDQ containment behavior 343 models the containment of defects determined to be real by HDQ Analysis behavior 342 and outputs data configured to represent the overall level of defect propagation in the containment process, including data regarding whether or not recalls are needed. HDQ false alarm behavior 344 models the introduction of false alarms at Level 4.

Figure 8:
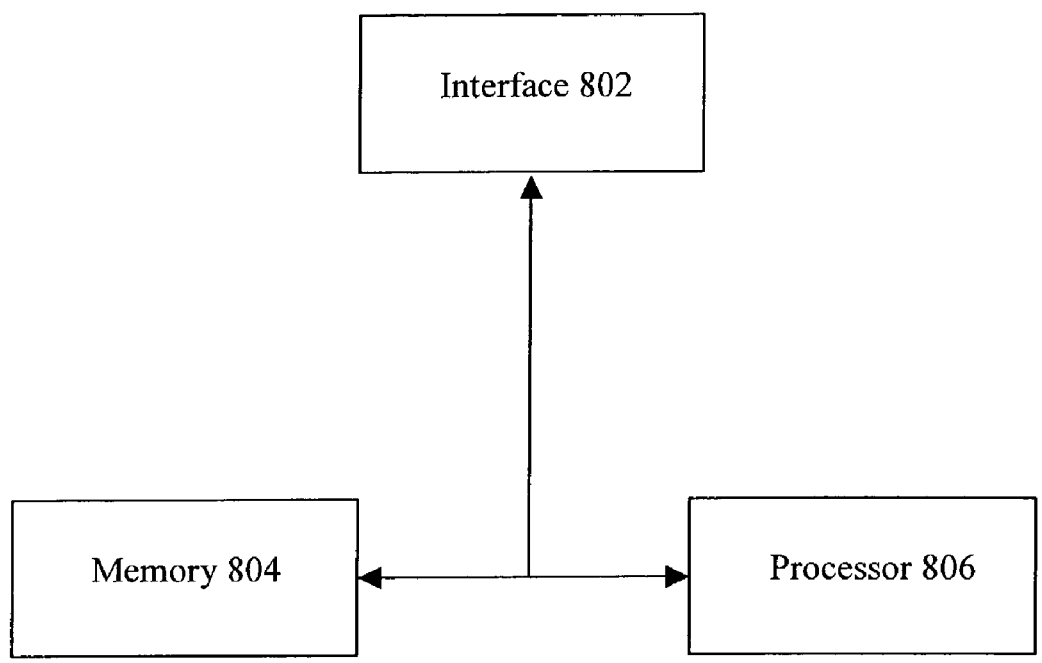
FIG. 8 is a schematic view depicting a computer system according to an embodiment of the present invention.

FIG. 8 is a block diagram depicting an exemplary computer system 800 that may be used in connection with various embodiments described herein. System 800 includes interface 802, memory 804 and processor 806. Interface 802 is configured to enable a user to build topological model 200, including multiple containment levels 210, with each having a containment node 240. Interface 802 is further configured to enable the user to assign behavior 250 to each containment node. Interface 802 allows software and data to be transferred between system 800 and external devices, networks or information sources. Examples of some types of components that might comprise interface 802 include a keyboard, a mouse, a modem, a network interface (such as an Ethernet card), a communications port, a PCMCIA slot and card, and an infrared interface, to name a few.

Interface 802 preferably implements industry promulgated protocol standards, such as Ethernet IEEE 802 standards, Fibre Channel, digital subscriber line (DSL), asymmetric digital subscriber line (ASDL), frame relay, asynchronous transfer mode (ATM), integrated services digital network (ISDN), personal communications services (PCS), transmission control protocol/Internet protocol (TCP/IP), serial line Internet protocol/point to point, protocol (SLIP/PPP), and so on, but may also implement non-standard interface protocols as well.

Memory 804 is configured to store topological model 200 and behavior 250. Memory 804 provides storage of instructions and data for programs executing on processor 806. Memory 804 can be semiconductor-based memory such as dynamic random access memory (DRAM) and/or static random access memory (SRAM). Other semiconductor-based memory types include, for example, synchronous dynamic random access memory (SDRAM), ferroelectric random access memory (FRAM), and the like, as well as read only memory (ROM). Memory 804 can also be a hard disk drive and/or a removable storage drive, for example a floppy disk drive, a magnetic tape drive, an optical disk drive, etc. Memory 804 includes a computer usable storage medium having stored therein computer software and/or data.

Processor 806 is configured to execute model 200 and output data configured to represent the level of defect propagation present in the containment process. Processor 806 can be any processor capable of executing model 200 and outputting data, including a processor configured to manage input/output, a processor to perform floating point mathematical operations, a special-purpose microprocessor having an architecture suitable for fast execution of signal processing algorithms ("digital signal processor"), a slave processor subordinate to a main processor system ("back-end processor"), or a coprocessor.

In an embodiment where model 200 is implemented using software, the software may be stored in a computer readable medium and loaded into system 800 via interface 802 or memory 804. The computer readable medium provides sequences of instructions (i.e., computer executable code) that cause processor 806 to perform the steps for modeling a containment process as described herein.

In this description, a computer readable medium is defined as a means for providing executable code, sequences of instructions, programming and software to processor 806. Such computer programs, when executed, enable processor 806 to carry out its designed functionality, in particular executing model 200 and outputting data configured to represent the level of defect propagation present in the containment process. The computer readable medium can be any storage device such as a semiconductor-based memory, a hard disk drive and/or a removable storage drive, for example a memory stick, floppy disk, a mini disc, a compact disc ("CD"), a digital versatile disc ("DVD"), etc. Additionally, memory 804 may logically comprise one or more databases adaptable for storage of the desired information.

Various embodiments may also be implemented primarily in hardware using, for example, components such as application specific integrated circuits ("ASICs"), or field programmable gate arrays ("FPGAs"). Implementation of a hardware state machine capable of performing the functions described herein will be apparent those skilled in the relevant art. Various embodiments may also be implemented using a combination of both hardware and software.

The systems and methods for modeling a containment process are described in the illustrated embodiment in FIGS. 3–7 in terms of an example automotive vehicle manufacturing environment. Description in these terms is provided for ease of discussion only. Accordingly, this example is not intended to limit the invention to particular applications.

While the, particular systems and methods for modeling a containment process herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for modeling a containment process, comprising:
    building a topological model of a containment process comprising a plurality of containment levels, each containment level comprising a containment node;
    assigning a behavior to each containment node, the behavior configured to model defect propagation and a containment response based upon a first predetermined level of data fusion in the containment node;
    executing the model with the first predetermined level of data fusion;
    outputting first data configured to represent the level of defect propagation present in the containment process; and
    modeling a second predetermined level of data fusion different from the first predetermined level of data fusion.

2. The method of claim 1, wherein the behavior is further configured to model defect propagation based upon a predetermined level of automation in the node.

3. The method of claim 1, wherein the behavior is further configured to introduce a defect into the containment process according to a probabilistic distribution.

4. The method of claim 1, wherein the containment node is configured to interact with another containment node.

5. The method of claim 1, wherein, the behavior is further configured to model a response to defect propagation at the node.

6. The method of claim 5, wherein the response is modeled in terms of the accuracy of the response.

7. The method of claim 5, wherein the response is modeled in terms of the amount of time used to make the response.

8. A computer readable medium having stored thereon one or more sequences of instructions for causing one or more microprocessors to perform the steps for modeling a containment process, the steps comprising:
    building a topological model of a containment process comprising a plurality of containment levels, each containment level comprising a containment node;
    assigning a behavior to each containment node, the behavior configured to model defect propagation and a containment response based upon a first predetermined level of data fusion in the containment node;
    executing the model with the first predetermined level of data fusion;
    outputting first data configured to represent the level of defect propagation present in the containment process; and
    modeling a second predetermined level of data fusion different from the first predetermined level of data fusion.

9. The computer readable medium of claim 8, wherein the behavior is further configured to model defect propagation based upon a predetermined level of automation in the node.

10. The computer readable medium of claim 8, wherein the behavior is further configured to introduce a defect into the containment process according to a probabilistic distribution.

11. The computer readable medium of claim 8, wherein the containment node is configured to interact with another containment node.

12. The computer readable medium of claim 8, wherein the behavior is further configured to model a response to defect propagation at the node.

13. The computer readable medium of claim 12, wherein the response is modeled in terms of the accuracy of the response.

14. The computer readable medium of claim 12, wherein the response is modeled in terms of the amount of time used to make the response.

15. A system for modeling a containment process, comprising:
    an interface configured to enable a user to build a topological model of a containment process comprising a plurality of containment levels, each containment level comprising a containment node, and further configured to enable the user to assign a behavior to each containment node, the behavior configured to model defect propagation and a containment response based upon a first predetermined level of data fusion in the containment node;

a memory configured to store the topological model and the behavior and a processor configured to execute the model with the first predetermined level of data fusion, output first data configured to represent the level of defect propagation present in the containment process and model a second predetermined level of data fusion different from the first predetermined level of data fusion.

16. The system of claim 15, wherein the behavior is further configured to model defect propagation based upon a predetermined level of automation in the node.

17. The system of claim 15, wherein the behavior is further configured to introduce a defect into the containment process according to a probabilistic distribution.

18. The system of claim 15, wherein the containment node is configured to interact with another containment node.

19. The system of claim 15, wherein the behavior is further configured to model a response to defect propagation at the node.

20. The system of claim 19, wherein the response is modeled in terms of the accuracy of the response.

21. The system of claim 19, wherein the response is modeled in terms of the amount of time used to make the response.

* * * * *